United States Patent [19]
Zellweger

[11] Patent Number: 6,131,098
[45] Date of Patent: Oct. 10, 2000

[54] METHOD AND APPARATUS FOR A DATABASE MANAGEMENT SYSTEM CONTENT MENU

[76] Inventor: Paul Zellweger, 12 Holworthy Pl., Cambridge, Mass. 02138

[21] Appl. No.: 09/033,774

[22] Filed: Mar. 3, 1998

Related U.S. Application Data

[60] Provisional application No. 60/039,878, Mar. 4, 1997.

[51] Int. Cl.[7] .................................................. G06F 17/30
[52] U.S. Cl. ........................ 707/102; 707/100; 707/103; 707/104
[58] Field of Search ............................. 345/333; 707/102, 707/103, 104, 100

[56] References Cited

U.S. PATENT DOCUMENTS

| | | | |
|---|---|---|---|
| 4,688,195 | 8/1987 | Thompson et al. | 707/102 |
| 5,261,042 | 11/1993 | Brandt | 395/156 |
| 5,295,261 | 3/1994 | Simonetti | 395/600 |
| 5,519,859 | 5/1996 | Grace et al. | 395/600 |
| 5,555,367 | 9/1996 | Premerlani et al. | 395/161 |
| 5,630,117 | 5/1997 | Oren et al. | 395/602 |
| 5,630,125 | 5/1997 | Zellweger | 395/600 |
| 5,701,453 | 12/1997 | Malone et al. | 395/602 |
| 5,748,929 | 5/1998 | Conrad et al. | 395/352 |
| 5,864,856 | 1/1999 | Young | 707/100 |

OTHER PUBLICATIONS

U.S. application No. 60/039,877, Zellweger, filed Mar. 4, 1997.

U.S. application No. 60/039,880, Zellweger, filed Mar. 4, 1997.

*Primary Examiner*—Thomas G. Black
*Assistant Examiner*—Frantz Coby

[57] ABSTRACT

The present invention discloses the means to build a content menu for a database management system. A content menu is an end-user access method that consists of a list of lists that describe content in an information system. End-users navigate the content menu to locate information objects at the end of a menu path. Unlike prior content menus, this invention disclosures the means to generate metadata that provide the basis for producing a content menu, at runtime, using "working" content managed by the database. A database structure stores the metadata. The metadata includes database commands and values that produce a list menu and link it to another list menu or information object.

22 Claims, 8 Drawing Sheets

Fig. 1

PRIOR ART

PRIOR ART

| BID | Author | Title | Language | Subject | PID |
|-----|--------|-------|----------|---------|-----|
| A | West, T.W. | Architecture In Scotland | English | Scotland | 617 |
| B | Turner, W.J. | British Craftsmanship | English | England | 864 |
| C | Liscombe, C.W. | Francis Rattenbury and BC | English | Canada | 10 |
| D | Meyer, Peter | Schweizer Wohnhauser | German | Switzerland | 40 |

Fig. 4a 70
65

| PID | Pub_Name | Pub_City | Pub_Country |
|-----|----------|----------|-------------|
| 617 | McKay | New York | United States |
| 864 | Collins | London | England |
| 10 | University of British Columbia | Vancouver | Canada |
| 40 | Grisberger | Zurich | Switzerland |

Fig. 4b

| REC | TOPIC | TAG | NEXT_ELM | LAST_ELM | LEVEL |
|---|---|---|---|---|---|
| 0 | [ root node ] | 10 | 1 | NULL | 0 |
| 1 | Author | 11 | 100 | 0 | 1 |
| 2 | Language | 12 | 102 | 0 | 1 |
| 3 | Publisher | 13 | 103 | 0 | 1 |
| 4 | Subject | 14 | 105 | 0 | 1 |
| 5 | Titles | 15 | 106 | 0 | 1 |

Fig 5a

| REC | DBMS_SOURCE | D_EXPRESSION | S_CONDITION | LINK_SOURCE | TAG | LAST_ELM | NEXT_ELM |
|---|---|---|---|---|---|---|---|
| 100 | Books | Author | "AUTHOR IS NOT NUL" | BID | NULL | 1 | 101 |
| 101 | Books | Title | "TITLE IS NOT NULL" | BID | -1 | 100 | NULL |
| 102 | Books | Language | "LANGUAGE IS NOT N" | BID | NULL | 2 | 101 |
| 103 | Publisher | Pub_Name | "PUB_NAME IS NOT N" | PID | NULL | 3 | 104 |
| 104 | Books | Language | "LANGUAGE IS NOT N" | PID | NULL | 103 | 101 |
| 105 | Books | Subject | "SUBJECT IS NOT NU" | BID | NULL | 4 | 101 |
| 106 | Books | Title | "TITLE IS NOT NULL" | BID | NULL | 5 | 101 |

METHOD AND APPARATUS FOR A DATABASE MANAGEMENT SYSTEM CONTENT MENU

CROSS REFERENCE TO RELATED APPLICATION

This application is based on Provisional Application No. 60/039,878 entitled Method and Apparatus for Generating Real Time Menu Access for a Relational Database Management System, filed Mar. 4, 1997.

FIELD OF INVENTION

The present invention relates to an end-user menu system on a database system. In particular, it discloses how to generate a content menu, at runtime, using metadata in conjunction with non menu database content.

REFERENCES

U.S. patent Documents

| | | | |
|---|---|---|---|
| 09/033,775 | 3/4/1997 | Zellweger | |
| 09/033,764 | 3/4/1997 | Zellweger | |
| 5,864,856 | 1/26/1999 | Young | 707/100 |
| 5,748,929 | 5/5/1998 | Conrad et al. | 395/352 |
| 5,701,453 | 12/23/1997 | Malone et al. | 395/602 |
| 5,630,125 | 5/13/1997 | Zellweger | 395/600 |
| 5,630,117 | 5/13/1997 | Oren et al. | 395/602 |
| 5,555,367 | 9/10/1996 | Premerlani et al. | 395/161 |
| 5,519,859 | 5/21/1996 | Grace et al. | 395/600 |
| 5,295,261 | 3/15/1994 | Simonetti | 395/600 |
| 5,261,042 | 11/09/1993 | Brandt | 395/156 |
| 4,688,195 | 8/18/1987 | Thompson et al. | 707/102 |

OTHER REFERENCES

Date, C. J. An Introduction to Database Systems. vol. 1, Reading, Mass. Addison-Wesley, 1986.

Wood, Derrick. Data Structures, Algorithms, and Performance. Reading, Mass. Addison-Welsey, 1993.

Zellweger, Paul. "Web-based Sales: Defining the Cognitive Buyer." International Journal of Electronic Markets. Vol. 7 No. pp. 16–22.

Zellweger, Paul. "The Knowledge Tree." unpublished paper. Copyright, 1998 ArborWay Electronic Publishing, Inc. Jan. 3, 1998.

BACKGROUND OF THE INVENTION

A database is a technical environment that is difficult for end-users to master. For this reason end-user access to database content is a challenge. The database architecture dictates how data and information is stored and how its query language works. To help end-users formulate query languages Grace et al. (U.S. Pat. No. 5,519,859) automate the selection of database components, and Premerlani et al. (U.S. Pat. No. 5,555,367) provide an object-oriented diagram. Maloney et al. (U.S. Pat. No. 5,701,453) go one step further by creating a logical schema of the underlying database to facilitate the development of end-user access methods. All of these improvements, however, are still very dependent upon the logical structure of the underlying database and the query language.

In contrast, the content menu is an access method based on the semantic associations drawn from an information domain. The content menu functions like an index in the back of a book, producing a list of lists that is independent of the underlying database architecture. Prior disclosures (Zellweger, U.S. Pat. No. 5,630,125) employ an open hierarchical data structure to store and manage menu data for the content menu. However, while prior disclosures teach how to generate menu paths from external sources (Zellweger, Ser. No. 09/033,775), the structure's menu data store static values that have to be updated manually or through program control. For highly volatile data, in a dynamic environment, these prior methods are far too inefficient to work effectively.

To solve this problem, the present invention uses working data content in a database to generate a content menu at runtime. The present invention uses the code expression of the prior art (Zellweger Ser. No. 09/033,764 & Zellweger Ser. No. 09/039,877) to demonstrate one way to relate a set of data in a database to another set of data in a database in order to produce a series of connected list menus known as a content menu that lead to an information object. However, the present invention uses this coded expression to generate metadata, something never intended by the prior art.

End-users navigate list menus in a content menu to reach an information object at the end of a menu path. Prior art in producing a database navigation structure includes Simonetti (U.S. Pat. No. 5,295,261) and Oren et al. (U.S. Pat. No. 5,630,117). However, the "topological map" produced by Simonetti requires an expert understanding of both the database structure and content to use this method effectively. And Oren's navigation means, a hypertext interface, is mediated by a set of index terms associated with database objects.

OBJECT AND ADVANTAGES

It is a general object of the present invention to provide a method and apparatus for a graphical user interface that can be used by end-users to locate information managed by a database system.

One object of the present invention is to provide the means to enable end-users to navigate through successive list menus to locate information.

Another object of the present invention is to provide the means to generate menu data for a list menu at runtime.

One object of the present invention is to provide the means to automate the process of building an end-user menu system.

Another object of the present invention is to provide the means to parse a programming command language that represents relationships between sets of data and information objects that map to a series of successive list menus.

One object of the present invention is to provide a means to coordinate the access means across two or more databases.

Another object of the present invention is to provide access to information stored in databases located on various computers.

One object of the present invention is to provide access to information stored in various databases in a computer network.

Another object of the present invention is to provide access to information independent of the database architecture.

One object of the present invention is to provide access means to information that can be calculated at run time.

SUMMARY OF THE INVENTION

The objects of the invention are attained by providing the methods and apparatus to create menu metadata and store it in a database. The metadata relates one set of database values to another that when used in conjunction with menu generation program logic produces a series of nested list menus associated with a content menu.

DETAILED DESCRIPTION OF THE PREFERRED EMBODIMENT

Figure 1:
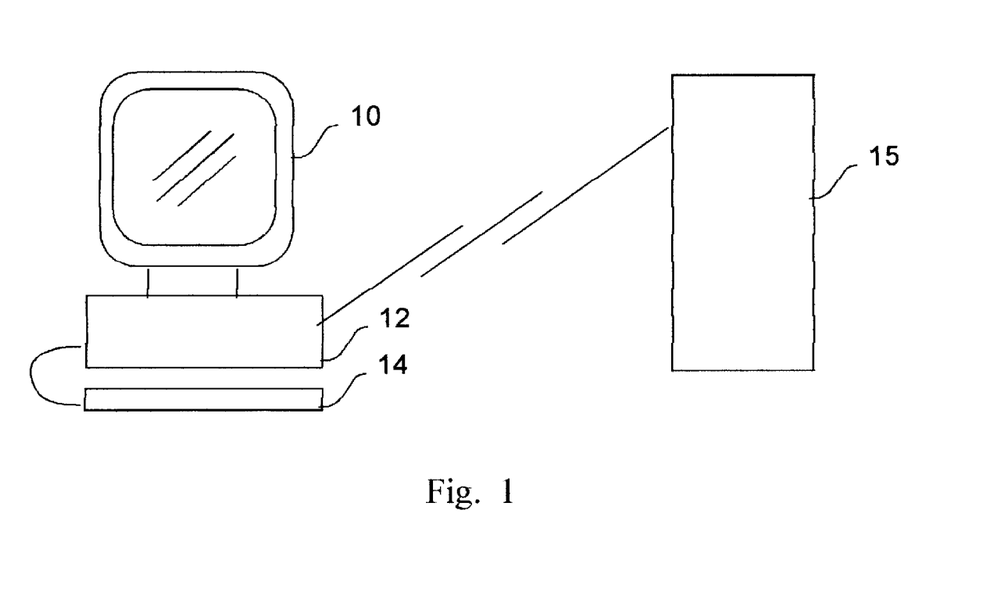
FIG. 1 is a graphical representation of the computer apparatus of the present invention.

The apparatus of the present invention, a computer monitor 10, keyboard input device 14, local computer 12, and remote computer 15, is displayed in FIG. 1. The computer monitor 10 displays the graphical user interface of the present invention. Input devices like the keyboard device 14 are connected to a local computer 12. Alternative input devices include voice recognition means, as well as other perceptual-motor and sensory-perceptual input means.

The local computer 12 is electronically linked to one or more computers, like remote computer 15, through network communications. Sources of menu data for the present invention include database files on both the local computer 12 and remote computer 15.

Figure 2A:
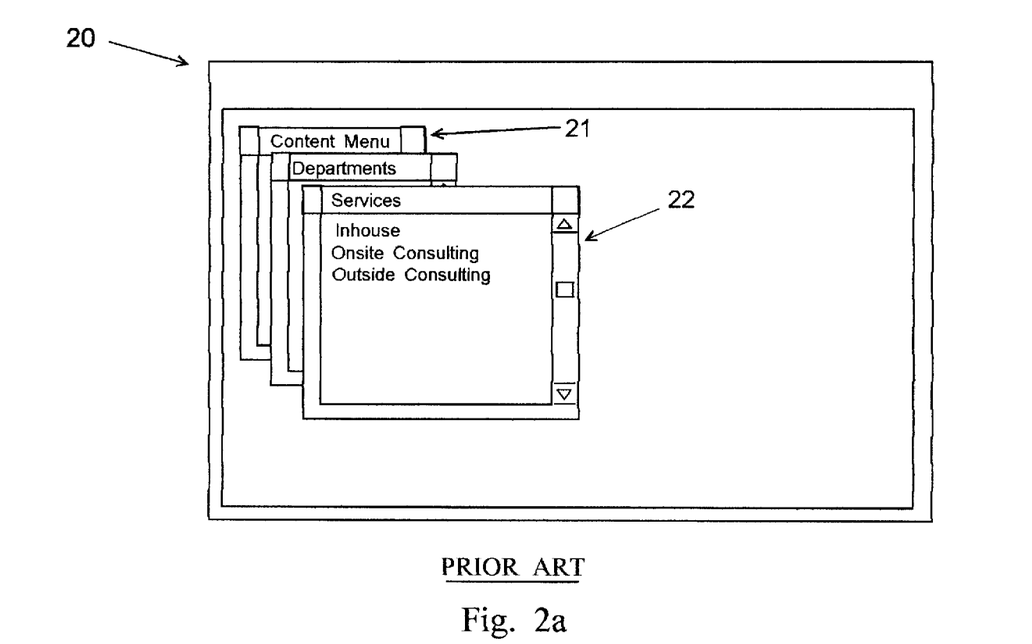
FIGS. 2a and 2b are a graphic representation of the prior art of the content menu and its underlying open hierarchical data structure.

A graphical description of the prior art of the content menu is depicted in FIG. 2a. Content menu 21 is displayed in window 20 monitor 10 of computer 12. Content menu 21 consists of one or more nested list menu 22. Each list menu 22 includes a menu title, one or more menu topics or entries, and, if needed, a scrolling region.

Figure 2B:
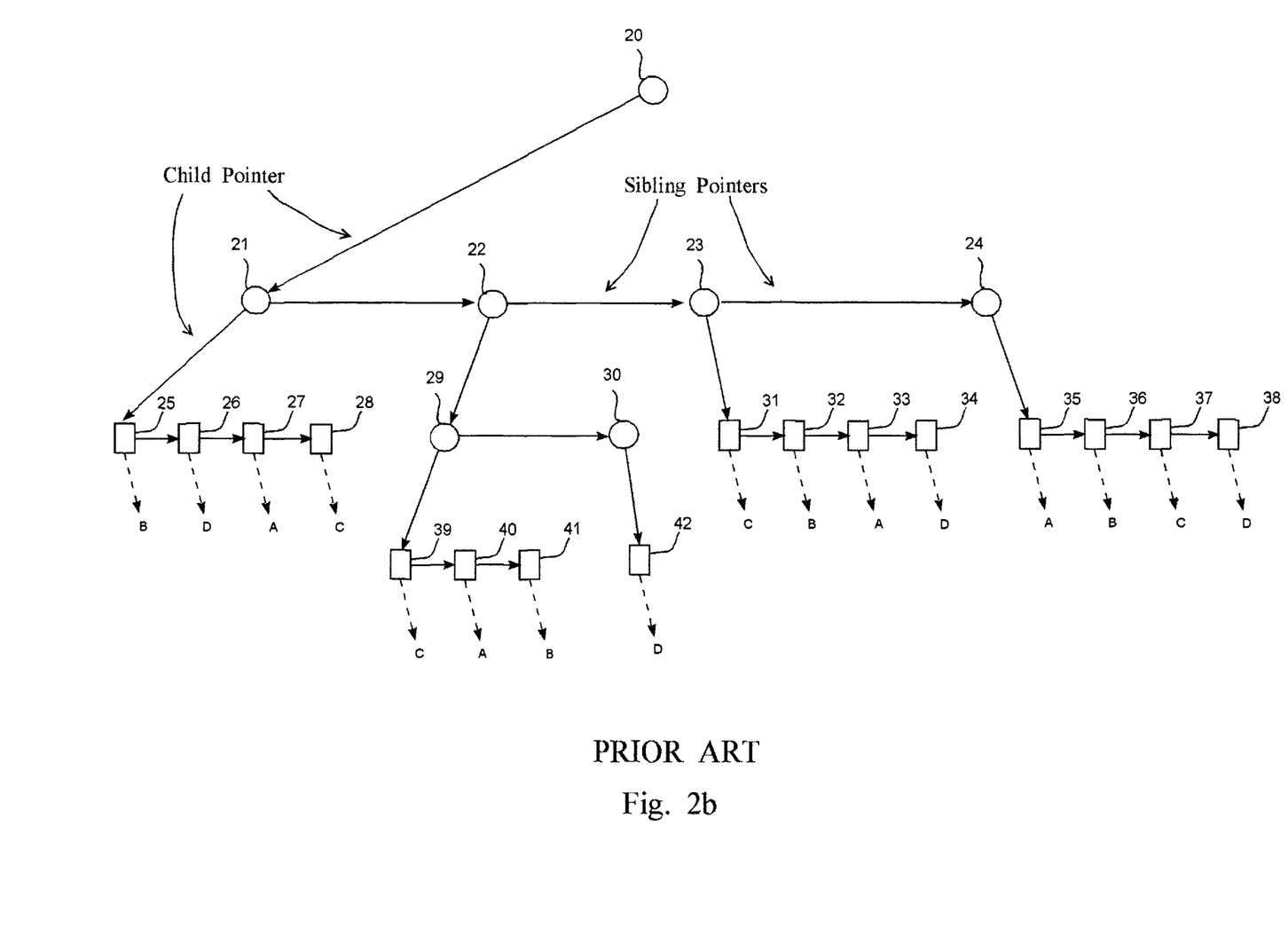

The prior art of the open hierarchical data structure, the underlying technical basis for content menu 21, is depicted in FIG. 2b. Sibling pointers in structure 29 link topic information together to produce list menu and child pointers link one list to another. Each path in structure 29 flows from a root node 20 to an information object A, B, C, or D at the bottom of the structure and corresponds to a menu path taken by an end-user. The distinctive feature of content 21 and its underlying structure 29 is that multiple paths can reach the same information object.

Figure 3:
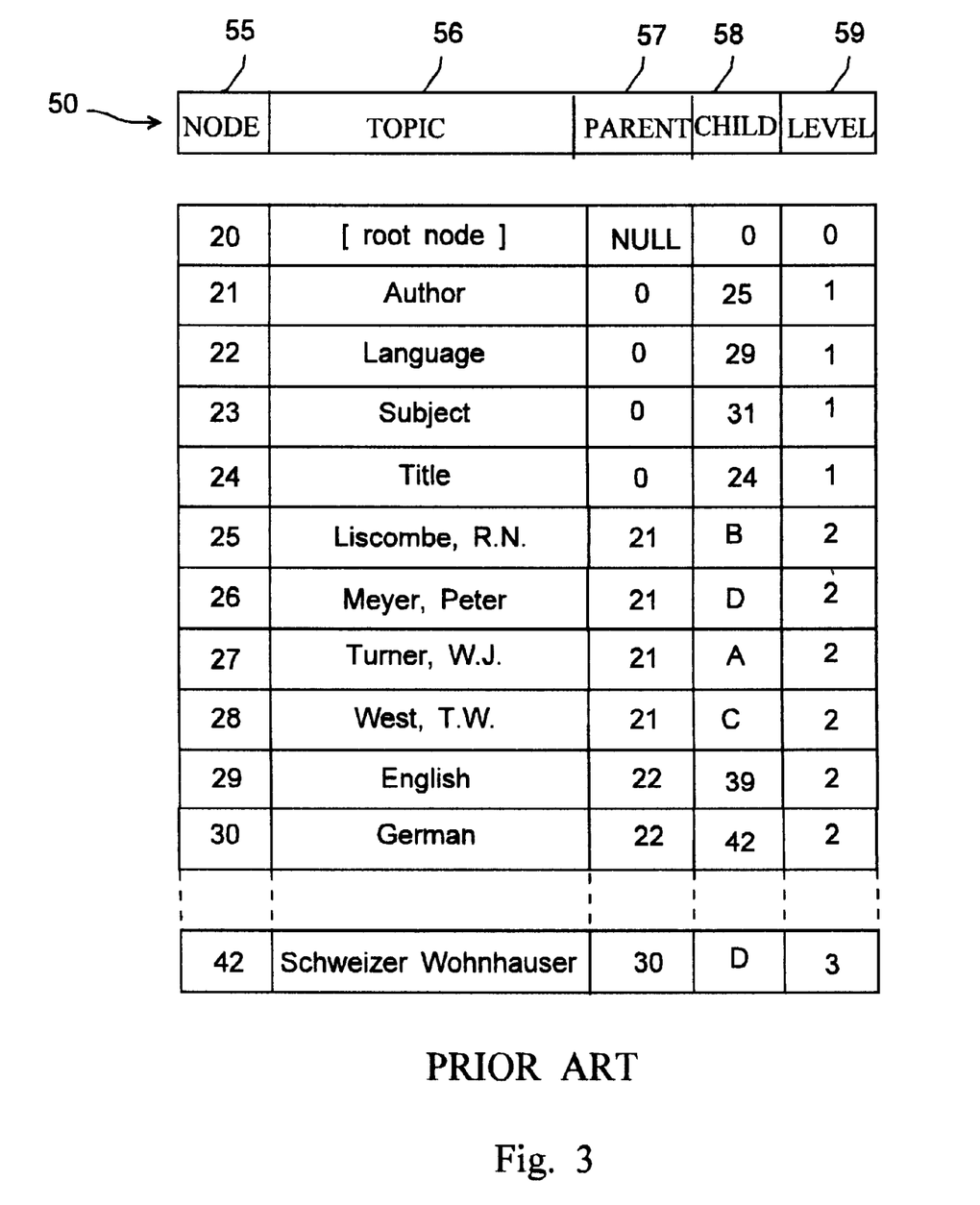
FIG. 3 is a graphical depiction of the prior art, a database that represents nodes in the open hierarchical data structure.

FIG. 3 depicts a database structure 50 used by the prior art to represent nodes in the structure presented in FIG. 2. Each row in the database structure represents a node, and the columns or fields represent information pertinent to a node, such as its unique identifier in column 55 or links to a parent node in column 57. As mentioned earlier in the background section, the essential limitation to this prior art is that menu data in structure 50 is static.

To demonstrate an embodiment of the present invention, a relational database management system (RDBMS) will be used. Alternative embodiments of the present invention employ other database architecture's, such as a network database or an object oriented database.

Figure 4A:
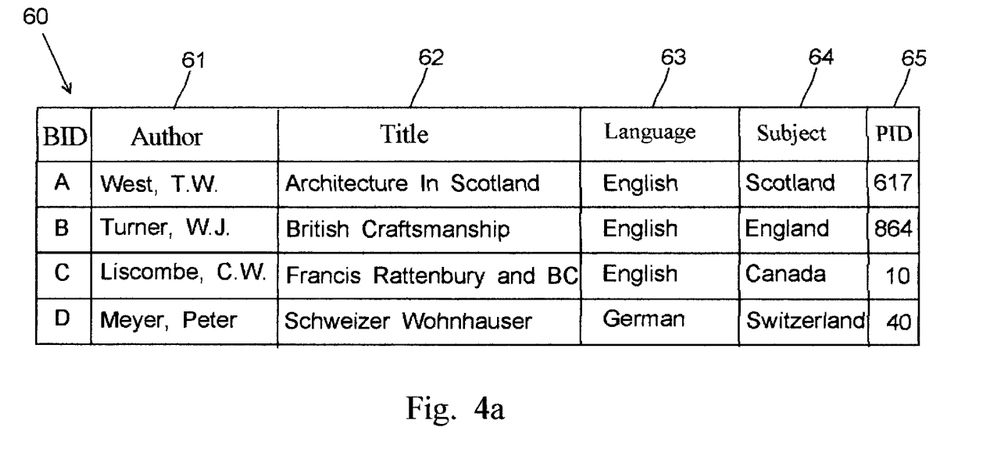
FIGS. 4a and 4b are a graphical depiction of a database that represents sample input data used to demonstrate the present invention.
Figure 4B:
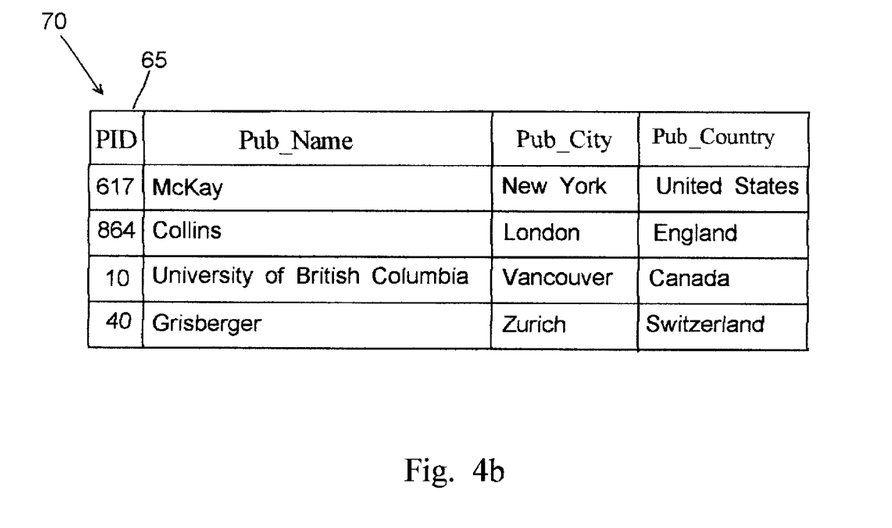

Sample input data used to demonstrate the present invention is presented in FIG. 4a and FIG. 4b. FIG. 4a depicts the columns and rows in the Books table 60. Each row represents a book in a sample demonstration set. Columns in the table store properties about each book, such as its author, in column 61, title in column 62, language in column 63, and subject matter in column 64. In order to avoid problems with updates and thereby satisfy requirements for normalization, book publishers is stored in a separate lookup table 70 depicted in FIG. 4b. The Books table 60 is linked to the Publishers table 70 by the PID column 65.

In the prior software art (Zellweger Ser. No. 60/039,880)., a predefined code was disclosed that establishes a relationship between external sources of data and an open hierarchical data structure in order to generate linked node records in table 50. The programming language includes the means to represent a menu path and connect it to an existing menu structure. The language in its most abstract form includes three elements, link node, list name, object lists.

The menu path in the present invention is derived from one or more embedded list objects. Each list object represents the means to map a set of display values to a set of linked nodes that correspond to a list menu. The succession of embedded list objects produces a succession of menu paths which lead to information objects. The syntax for the list object expression is, list object =(database source, display expression,(display link, object link or list object))

In contrast to the prior art, the present invention employs this list object expression to produce metadata for content menu. The elements of the list object in the present invention are derived from database structures. For instance, the database source refers to a database structure or object model, and the display expression and display link are derived from values stored in the database.

Figure 5A:
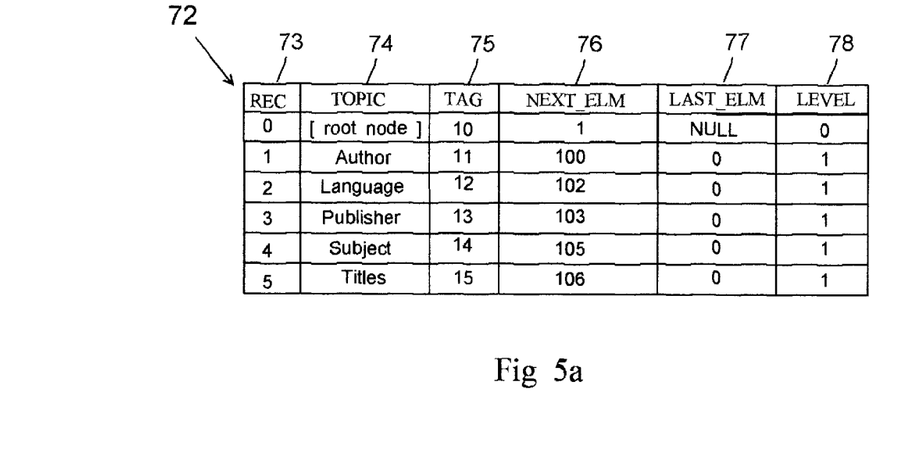
FIGS. 5a and 5b are a graphical representation of a database structure that stores metadata for the content menu system of the present invention.
Figure 5B:
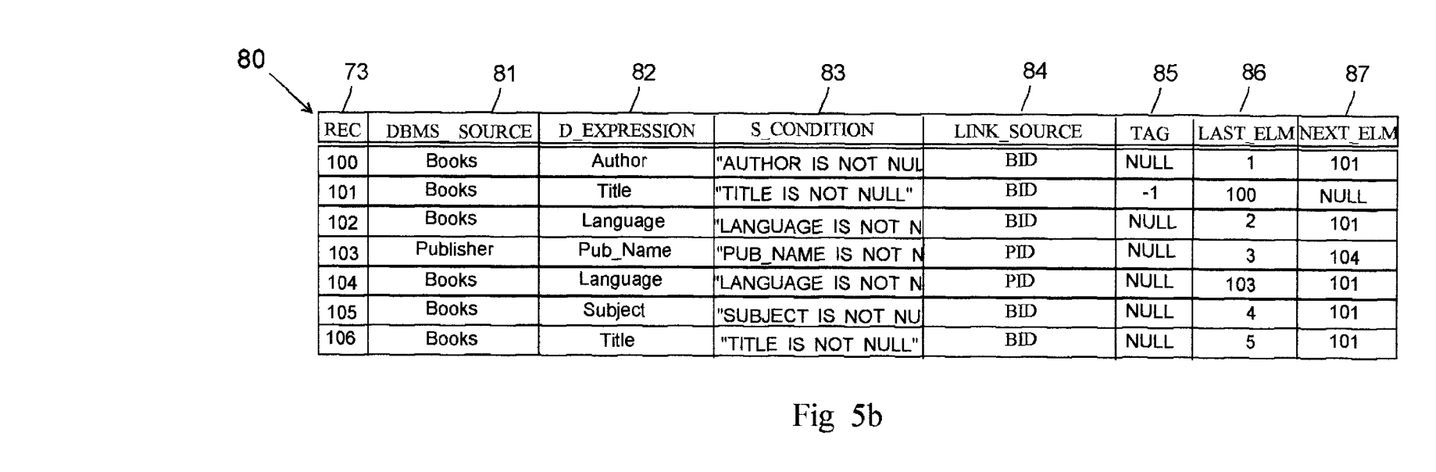

In the preferred embodiment of the present invention two different database structures are used: a trunk structure 72 and a menu structure 80 and depicted in FIGS. 5a and 5b. The trunk table 72 stores menu data for list menus that represent the broadest possible categories of information represented by the database. The menu structure 80, on the other hand, stores metadata, database commands and values, that produces list menus that refer to working data managed by the database.

Alternative database embodiments of the present invention use existing storage means to represent metadata according to the underlying database architecture, like an object model in an object oriented database, and the specifics of the database query language. As mentioned earlier, this disclosure uses a relational database architecture to demonstrate the present invention but this does not imply that the present invention is limited to the RDBMS architecture.

To demonstrate how to relate different sets of working data in a database the following code expression will be used, 0, Publisher,(Publish,Pub_Name, (PID,(Books, Language,(PID,(Books,Title,(BID,BID)))))

where,

0—first element in the command, the link node.

Publishers—second element in the command the list name that introduces a new menu entry under 0.

Next comes the third element, one or more embedded list objects:

(Publish, Pub_Name,(PID, . . . —an embedded list object.

(Books, Language,(PID, . . . —an embedded list object.

(Books, Title,(BID,BID)—basis list object.

In the prior art, this code generates a series of nodes in an open hierarchical data structure that supports a menu path of list menus that starts at the top of the menu structure, 0 for the root node. The command adds a new entry, Publisher, to the first list menu. Next comes a series of embedded list objects that produces a list of publishers' names, followed by a list of the languages represented by their books, which is followed by a list of their respective book titles.

In the present invention the same code produces database elements in structure 72 and in structure 80. Structure 72, the trunk table, is depicted in FIG. 5a. Each record in table 72 represents an entry in a list menu and has a unique value in field 73. Associated with each entry in the structure is a link value in NEXT_ELM field 76 that, depending upon its value, relates to a record in either trunk table 72 or menu table 80. The relationship created by field 76 corresponds to a child pointer in the open hierarchical data structure; its value links the current menu entry to information about another list menu or to an information object. In addition to structural information about each entry the trunk structure 72 also includes a TAG column 75 that contains a coded value used to identify a path taken by an end-user.

The menu table 80 is depicted in FIG. 5b. This database structure stores metadata for a list menu that is generated at runtime. Each row or record in menu table 80 stores metadata used to generate menu data for a list menu at runtime from existing database structures. Metadata includes information like the database source table in field 81, the display expression in field 82, the link column in field 84, and any selection conditions in field 83. As structure 80 can store metadata that can apply to any database structure including content in a structure like 72.

The database source in field 81 refers to the specification used to identify the database structure that contains menu data. The database specification includes information like network node labels and directory specifications, as well as table and field references. The display expression in field 82 refers to the database field location or object reference that contains the display string used for the menu entry. The display expression in field 82 also includes any built-in functions supported by the underlying database. The selection conditions in field 83 refer to any text strings that symbolically represent conditions placed on a database query command.

Metadata in the database structure also includes the means to link an existing list menu to another list menu or to an information object. In database structure 80 the NEXT_ELM field 87 stores these link values. These values either refer to values in REC field 73, or to a NULL value that indicates that LINK_SOURCE field 84 refers to a structure element that contains the link to an object information. Otherwise, the LINK_SOURCE field 84 refers to a structure element that contains values used to select menu data when going from one list menu to another.

Figure 6A:
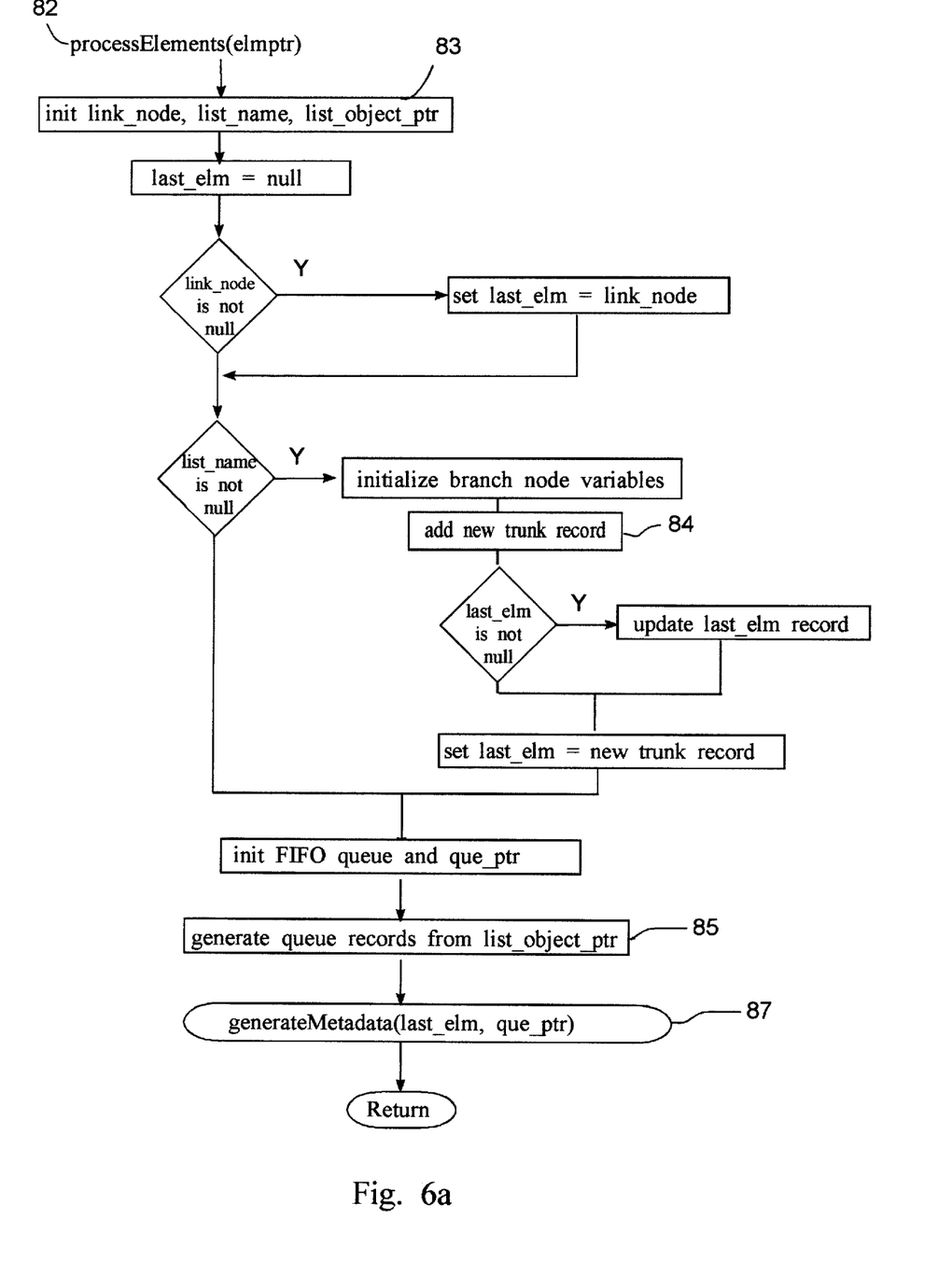
FIGS. 6a and 6b depict flow charts of the software methods used to generate metadata from an input programming language.
Figure 6B:
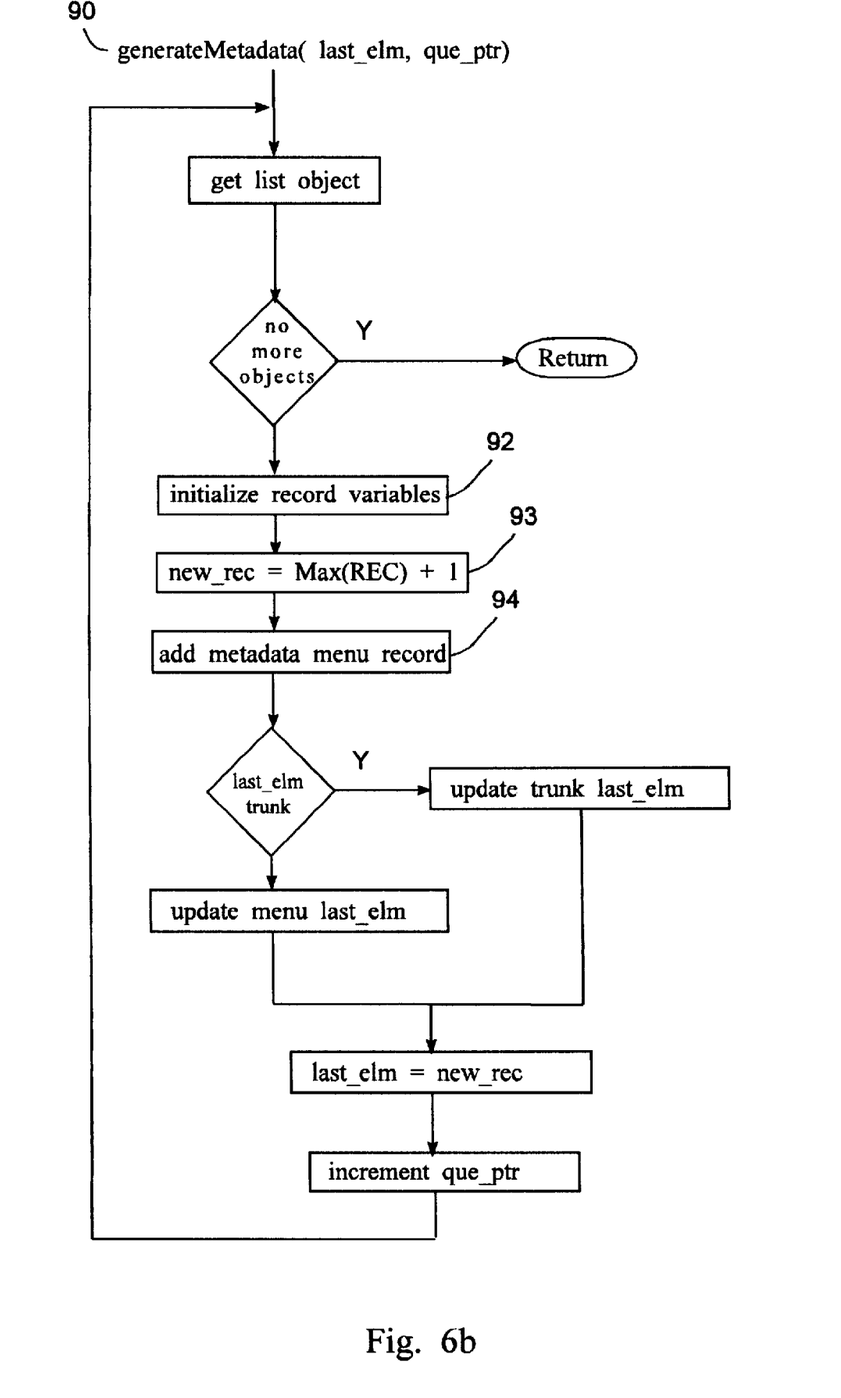

FIGS. 6a and 6b together depict the flow chart of the software means to generate list menus and metadata from predefined code. The code includes the means to produce metadata, responsible for the production of a list menu, from a set of values stored in a database. It also includes the means to connect metadata from one list menu to another, or to an information object. In addition, the language provides the means to connect a list menu to an existing menu structure.

FIG. 6a represents the method for parsing the input language elements at 83 from the input language pointer, elmptr. The link_node value represents a list menu entry, and the list_name value represents a new menu entry that points to the new menu path produced by these software means. The third element of the input language, list_object_ptr, points to one or more embedded list objects.

At 84, the processElements routine 82 adds an element to the trunk structure 72. Each new element represents a new menu entry in a list menu. Next, at 85 routine 82 parses through the list_object_ptr to generate records in a FIFO queue. Each record in the FIFO queue represents an embedded list object that includes information on the source display, the display expression, and the display link. At 87 routine 82 calls generateMetadata 90 passing a link to the prior menu entry, last_elm, and a pointer to the FIFO queue.

FIG. 6b represents the flow chart of the means of the present invention to generate metadata in database structure 80. The procedure generateMetadata 90 reads through each record in the FIFO queue till it reaches past the last list object record.

At 92, the generateMetadata routine 90 initializes input menu record variables from information contained in the current list object record in the queue, and at 93 it calculates a unique new_rec value for the REC field 73. Metadata associated with the current list object is then added to the menu structure 80 at 94. Next, routine 90 updates the prior menu element in structure 72 or 80 based on last_elm value. And before looping back to get the next list object from the FIFI queue routine 90 updates last_elm with the new_rec, and increments the pointer to the FIFO queue.

Figure 7:
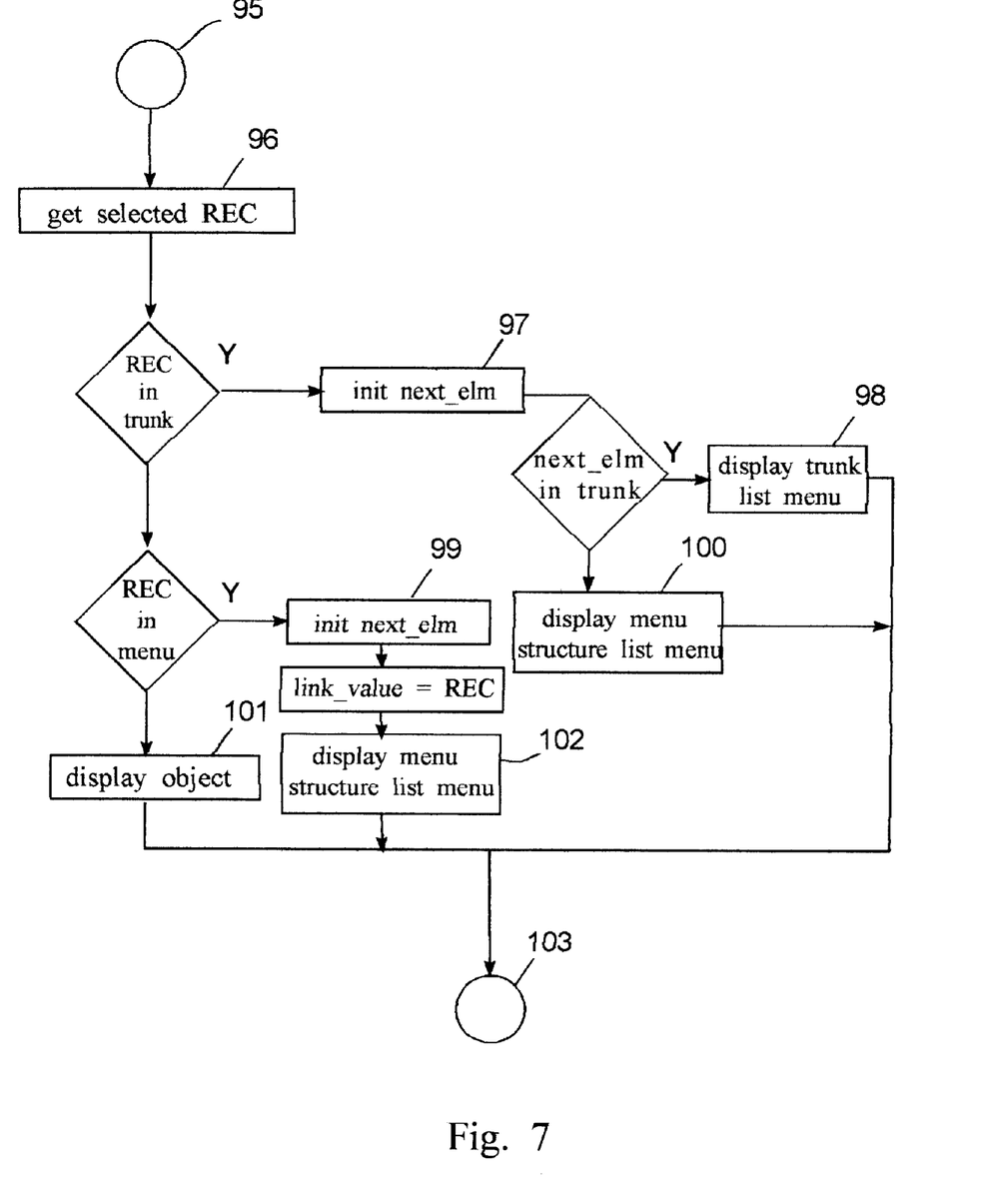
FIG. 7 depicts the flow chart in an embodiment of the present invention used to display list menus in a menu path.

Finally, FIG. 7 depicts the flow chart of the event-driven means used to display a list menu in a content menu of the present invention. When a list menu entry is selected program control is activated at 95. At 96 the REC value of the selected menu entry is fetched from the event queue.

If REC represents a trunk structure 72 value the routine initializes the next_elm variable at 97 from the NEXT_ELM column 76 corresponding to the REC value. If the next_elm value corresponds to the trunk structure 72, the list menu is generated from trunk records at 98. Otherwise the list menu is generated from records in the menu structure 80 at 100. To generate a list menu at 98, the routine selects all records in structure 72 whose LAST_ELM values equal the selected REC value. Each record that meets this condition contains data for a menu entry for the list menu.

When a selected menu REC value corresponds to a menu record the routine fetches the next_elm value from NEXT_ELM column 87 at 99. Next, the routine assigns the selected REC value to the link_value variable. To create the list menu at 102 the routine refers to the column in the LINK_SOURCE column 84 to locate display records that match the link_value, and thereby link one metadata list menu to another.

And lastly, if the REC value of the selected entry is neither a trunk nor menu record then the present invention fetches the next_elm from the selected entry and uses it to generate and display the information object at 98. Program control flows to the most recent display at 103.

Glossary content database—a collection of information stored in a database management system.

content menu—an end-user menu system composed of a succession of nested list menus that enable one or more menu paths to lead to the same information object.

coded value—a code assigned to a menu entry that provides the means to identify a path selected by an end-user.

data—a distinct unit of information.

database source—the first element of a list object expression that refers to a database specification that refers to sources for the list menu entries.

destination link—the second element of the link pair in a list object expression.

display expression—the second element of a list object expression that is derived from a display source such as a database column and includes text functions and references supported by the underlying database. It can also include selection conditions supported by the database such as a WHERE clause in SQL.

display link—the first element of a link pair in a list object expression. The display link refers to a link source that contains link values associated with a source display.

information object—one or more media elements, like text or graphic image, that produce an object.

metdata—information about data such as where and how to find it.

link pair—the third element in the list object expression that contains a display link and a destination link. The destination link refers to an embedded list object expression or to an object link.

list object—a segment of the input command language that includes three elements: a database source, a display expression, and a link pair.

object link—a link source that contains a link value that connects to elements of an information object. An object link is always the second member of a link pair.

menu structure—the network of menu paths that flow from a single menu entry point to the information objects in an information management system.

open hierarchical data structure—a hierarchical structure composed of nodes and arcs that flows from a single root node through one or more nodes to an information object. The distinctive characteristic of this structure is that one or more paths flow to the same information object at die end of a path.

SQL—a special type of database query language primarily associated with relational database management systems.

WHERE clause—a command string segment based on SQL that is used to select specific rows in a display table by setting conditions on designated columns.

working data—database content generated and maintained by a database application.

Conclusion

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

Having described an embodiment of the invention we claim:

1. A menu management system on a computer processor consisting of,
   generating a set of metadata that forms the basis for a database query,
   storing s
   retrieving sata in a database structure,
   retrieving said set of metadata from said database structure to fetch a selection of menu data,
   retrieving said selection of menu data based on said database query,
   generating a list menu derived from said selection of menu data based on said database query that links to another said set of metadata,
   displaying said list menu,
   fetching a selection made by an end-user in said list menu,
   relating said selection made by said end-user to another said set of metadata in said database structure.

2. The menu management system of claim 1 wherein said menu management system is implemented in a computer program language that is compatible with at least one operating system on said computer processor.

3. The menu management system of claim 1 wherein said database query is implemented in a database command language that is compatible with at least on database management system.

4. The menu management system of claim 1, wherein generating said set of metadata further includes generating a database source in said set of metadata that identifies the location of said menu data.

5. The menu management system of claim 1, wherein generating said set of metadata further further includes generating a display expression in said set of metadata that provides menu data associated with a topic in said list menu.

6. The menu management system of claim 1, wherein generating said set of metadata further includes generating a display link in said set of metadata that provides a link value used to retrieve said selection of menu data.

7. The menu management system of claim 1, wherein said selection of menu data further includes generating a set of topic data for said list menu.

8. The menu management system of claim 1, wherein said selection of menu data further includes generating a set of link data for said list menu.

9. The menu management system of claim 1, wherein said list menu further includes linking to a path of a plurality of said list menu that links to the same said information object.

10. The menu management system on said computer processor of claim 1, wherein displaying said list menu is compatible with at least one operating system.

11. The menu management system of claim 1, wherein fetching said selection made by said end-user further includes fetching a tag that identifies characteristics about said selection made by said end-user.

12. A menu management system on a computer processor consisting of,
   a means for generating a set of metadata forms the basis for a database query,
   a means for storing said set of metadata in a database structure,
   a means for retrieving said set of metadata from said database structure to fetch a selection of menu data,
   a means for retrieving said selection of menu data based on said database query,
   a means for generating a list menu derived from said selection of menu data based on said database query that links to another said set of metadata,
   a means for displaying said list menu,
   a means for fetching a selection made by an end-user in said list menu,
   a means for relating said selection made by said end-user to another said set of metadata in said database structure.

13. The menu management system of claim 12, wherein said menu management system system is implemented in a computer program language that is compatible with at least one operating system on said computer processor.

14. The menu management system of claim 12, wherein said database query is implemented in a database command language that is compatible with at least on database management system.

15. The menu management system of claim 12, wherein said means for generating said set of metadata further includes the means for generating a database source in said set of metadata that identifies the location of said menu data.

16. The menu management system of claim 12, wherein said means for generating said set of metadata further includes the means for generating a display expression in said set of metadata that provides menu data associated with a topic in said list menu.

17. The menu management system of claim 12, wherein said means for generating said set of metadata further includes the means for generating a display link in said set of metadata that provides a link value used to retrieve said selection of menu data.

18. The menu management system of claim 12, wherein said selection of menu data further includes the means for generating a set of topic data for said list menu.

19. The menu management system of claim 12, wherein said selection of menu data further includes the means for generating a set of link data for said list menu.

20. The menu management system of claim 12, where said list menu further includes the means for linking to a path of a plurality of said list menu that link to the same said information object.

21. The menu management system of claim 12, wherein said means for displaying said list menu is compatible with at least one operating system.

22. The menu management system of claim 12, wherein said means forfetching said selection made by said end-user further includes the means for fetching a tag that identifies characteristics about said selection made by said end-user.

* * * * *